United States Patent
Borsadia

Patent Number: 5,774,446
Date of Patent: Jun. 30, 1998

[54] SEGMENTED AUDIO AND VISUAL COMPACT DISKS

[76] Inventor: Suresh Borsadia, 4887 S. 1710 East, Salt Lake City, Utah 84117

[21] Appl. No.: 580,454

[22] Filed: Dec. 27, 1995

[51] Int. Cl.$^6$ .............................. G11B 3/78; G11B 25/02
[52] U.S. Cl. ......................... 369/274; 369/179; 369/273; 369/290
[58] Field of Search ........................... 369/31, 214, 273, 369/289, 290, 292, 179, 274

[56] References Cited

U.S. PATENT DOCUMENTS

| | | | |
|---|---|---|---|
| 745,782 | 12/1903 | Castelin | 369/179 |
| 1,998,461 | 4/1935 | Kucher | 369/179 |
| 2,500,947 | 3/1950 | Jewett | 369/179 |
| 3,801,110 | 4/1974 | Licitis | 369/274 |
| 5,212,614 | 5/1993 | Hughes et al. | 360/133 |
| 5,539,599 | 7/1996 | Wilder | 360/133 |

Primary Examiner—Stuart S. Levy
Assistant Examiner—William R. Korzuch
Attorney, Agent, or Firm—Michael I. Kroll

[57] ABSTRACT

The present invention relates to a segmented cylindrical audio-visual device (10) having interlocking disks (12) a first disk (12A) has a first disk bottom side (12AB) with a first disk bottom side female connector (12ABB) centrally positioned thereon. The adjacent second disk (12B) has a second disk top side (12BA) with a second disk top side male connector (12BAB) centrally positioned thereon. The second disk top side male connector (12BAB) is complimentary to and inserts into the first disk bottom side female connector (12ABB) thereby interlocking the first disk (12A) to the adjacent second disk (12B). Each interlocked disk (12) has a disk side (12AC . . . 12JC) having a respective disk side audio-visual track (12ACA . . . 12JCA) thereon. The respective disk side audio-visual tracks (12ACA . . . 12JCA) each represent a separate audio and/or visual track analogous to a song and a music video, respectively. By a user interlocking different disks (12) together a customized audio and visual ensemble is formulated.

1 Claim, 3 Drawing Sheets

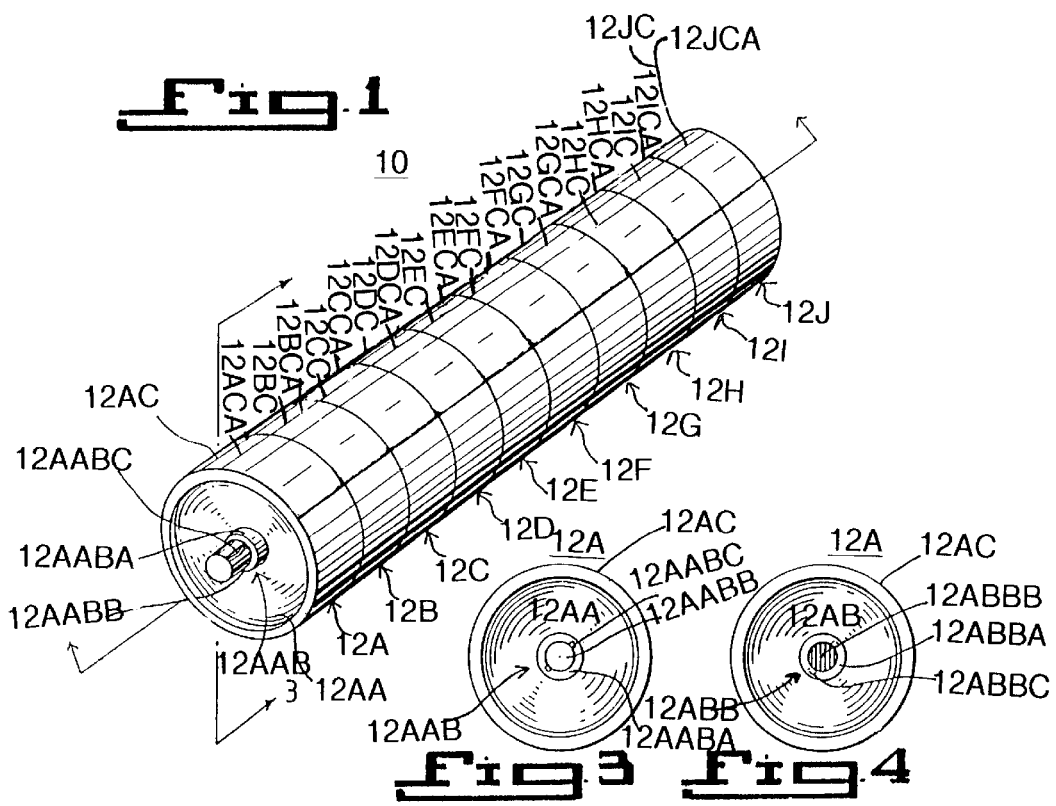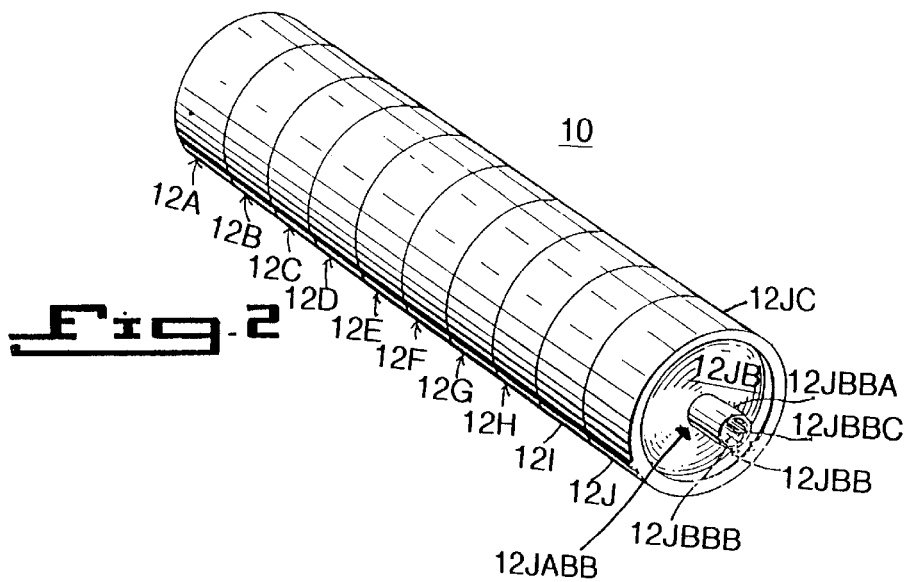

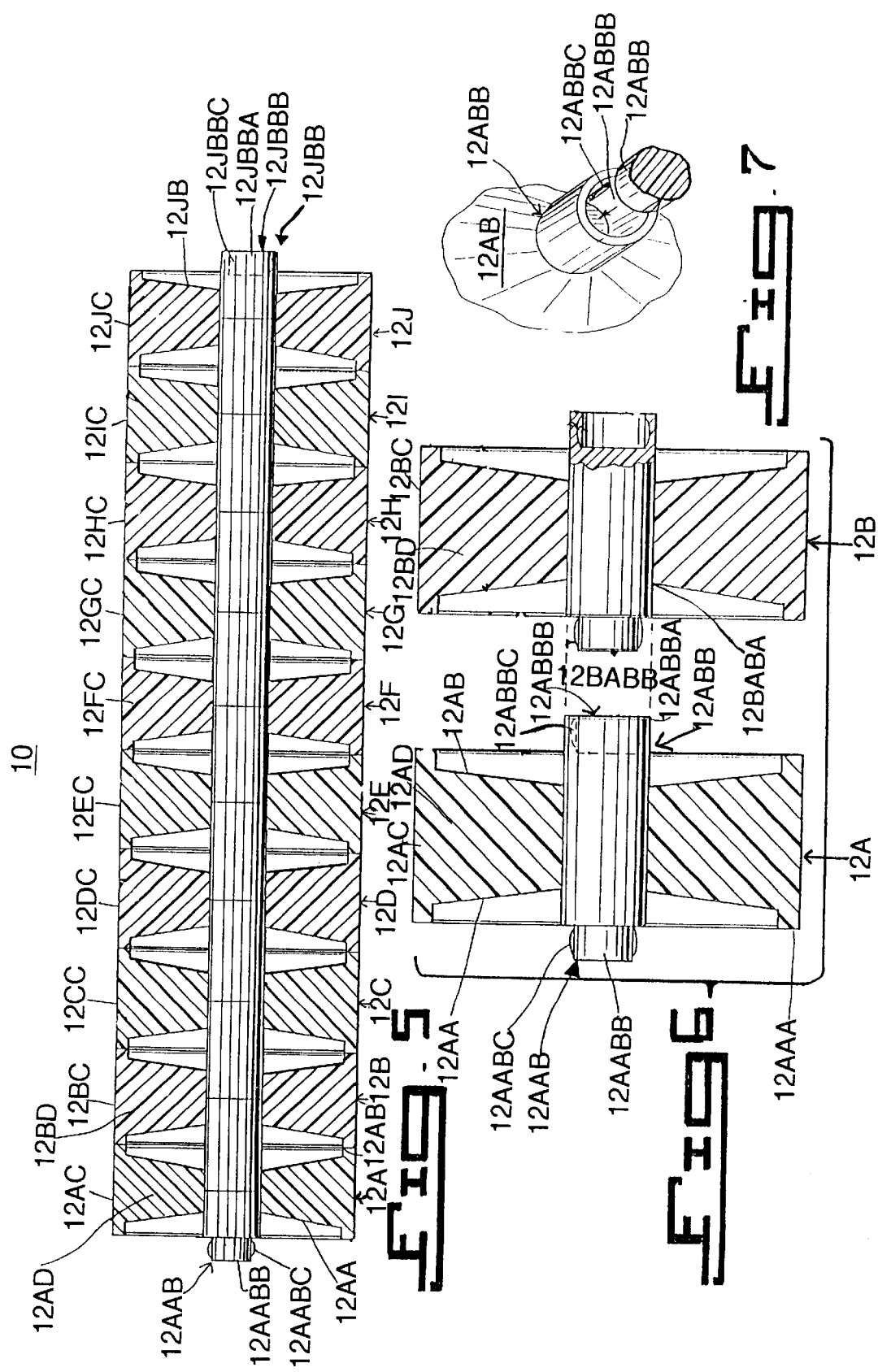

SEGMENTED AUDIO AND VISUAL COMPACT DISKS

BACKGROUND OF THE INVENTION

1. Field of the Invention

The present invention relates to a segmented cylindrical audio-visual device. More particularly, the present invention relates to a segmented cylindrical audio-visual device having interlocking disks having individual audio and visual tracks thereon. Upon combination of different interlocking disks produce a complete audio and visual ensemble.

2. Description of the Prior Art

Audio and visual optical disks are well known on the art. The most commonly known are the Compact Disk (CD) and Laser Disk (LD). Both of these disks are developed from the "record concept" which are flat platter-like disks which rotate utilizing an audio and/or visual scanning device and electronic reader. The major problem of these type of devices are their inflexibility as to customizing an ensemble of music. Presently, multi CD players have been introduced into the market which simultaneously allow access to a number of CD's allowing the player either to be programmed by the user for certain sound tracks on each disk which customizes the music ensemble. One of the limitations of the current system is that a multi CD player is very expensive and requires a great deal of technical know how to program a customized CD ensemble. Therefore, due to complex programmability, children, the learning disabled and elderly persons are prevented from using the multi CD devices. The present invention addresses the current problem of ensembling a customized audio-visual device by utilizing individual interlocking cylindrical disks. Each cylindrical disk having a separate audio and visual sound track.

Numerous innovations for an audio-visual device have been provided in the prior art that are described as follows. Even though these innovations may be suitable for the specific individual purposes to which they address, they differ from the present invention as hereinafter contrasted.

SUMMARY OF THE INVENTION

The present invention is a segmented cylindrical audio-visual device consisting of a multiple of interlocking disks. The disks interlock on the top and bottom to adjacent disks and the cylindrical side of the disk has a disk side audio-visual track. For example, since each disk contains one audio track of an musical artist which represents one song and lets say the song has been formulated into a music video, each separate disk would contain a single separate song and corresponding separate music video. Therefore, a user interlocks different separate disks together thereby formulating a customized audio and visual ensemble.

The types of problems encountered in the prior art are CD's and LD's cannot be customized into an audio-visual ensemble without the use of extremely expensive equipment which can accommodate multiple CD's and/or LD's.

In the prior art, unsuccessful attempts to solve this problem were attempted namely: developing and producing programmable multi-disk players being large in size. However, the problem was solved by the present invention because an inexpensive device could be manufactured that accommodates, for example, ten disks which the user could easily customize.

Innovations within the prior art are rapidly being exploited in the field of CD's and LD's.

The present invention went contrary to the teaching of the art of electronic programming multiple CD's or LD's to formulate a customized ensemble.

The present invention solved a long felt need to manually and not electronically formulate a customized CD or LD ensemble.

The present invention produced unexpected results namely: children, the learning disabled and elderly persons incapable of utilizing the complex electronic programmability of the multi CD and LD players could still utilize the present invention to formulate a customized ensemble.

A synergistic effect was produced utilizing the present invention due to the following facts and results from experimentaion: that physically handicapped persons gain physical therapy by utilizing the present invention.

Accordingly, it is an object of the present invention to provide a segmented cylindrical audio-visual device.

More particularly, it is an object of the present invention to provide a segmented cylindrical audio-visual device having multiple interlocking disks.

In keeping with these objects, and with others which will become apparent hereinafter, one feature of the present invention resides, briefly stated, in the interlocking disks having a disk top side with a centrally mounted disk top side male connector.

When the disk top side male connector is designed in accordance with the present invention, it consists of a disk top side male connector spacer having a disk top side male connector shaft attached thereto.

In accordance with another feature of the present invention, the disk top side male connector shaft has a disk top side male connector lock.

Another feature of the present invention is that the interlocking disk has a disk bottom side with a disk bottom side female connector centrally mounted thereon.

Yet another feature of the present invention is that the disk bottom side female connector consists of a disk bottom side female connector spacer having a disk bottom side female connector receptacle therein. The disk bottom side female connector receptacle is complimentary to the disk top side male connector shaft and receives it therein.

Still another feature of the present invention is that disk bottom side female connector recepticle has a disk bottom side female connector lock which is complimentary to the disk top side male connector lock and receives it therein.

Yet still another feature of the present invention is that the interlocking disk has a disk side with a disk side audio-visual track thereon.

Still yet another feature of the present invention is that the disk side audio-visual track is configured in disk side rows/columns divots commencing at disk side row A/column A davit and terminating at disk side row Z/column Z davit.

The novel features which are considered characteristic for the invention are set forth in the appended claims. The invention itself, however, both as to its construction and its method of operation together with additional objects and advantages thereof will be best understood from the following description of the specific embodiments when read and understood in connection with the accompanying drawing (s).

BRIEF DESCRIPTION OF THE PREFERRED EMBODIMENT

FIG. 1 is a left perspective view of a segmented cylindrical audio-visual device exhibiting a multiple of disks interlocked with one another.

FIG. 2 is a right perspective view of a segmented cylindrical audio-visual device exhibiting a multiple of disks interlocked with one another.

FIG. 3 is a top view of a first disk.

FIG. 4 is a bottom view of a first disk.

FIG. 5 is a cross-sectional view of a segmented cylindrical audio-visual device exhibiting a multiple of disks interlocked with one another.

FIG. 6 is a cross-sectional view of a first disk and second disk being interlocked with one another.

FIG. 7 is a bottom perspective view of a second disk having a second disk top side male connector shaft being inserted into a first disk bottom side female connector receptacle.

DETAILED DESCRIPTION OF THE PREFERRED EMBODIMENT

Figure 8:
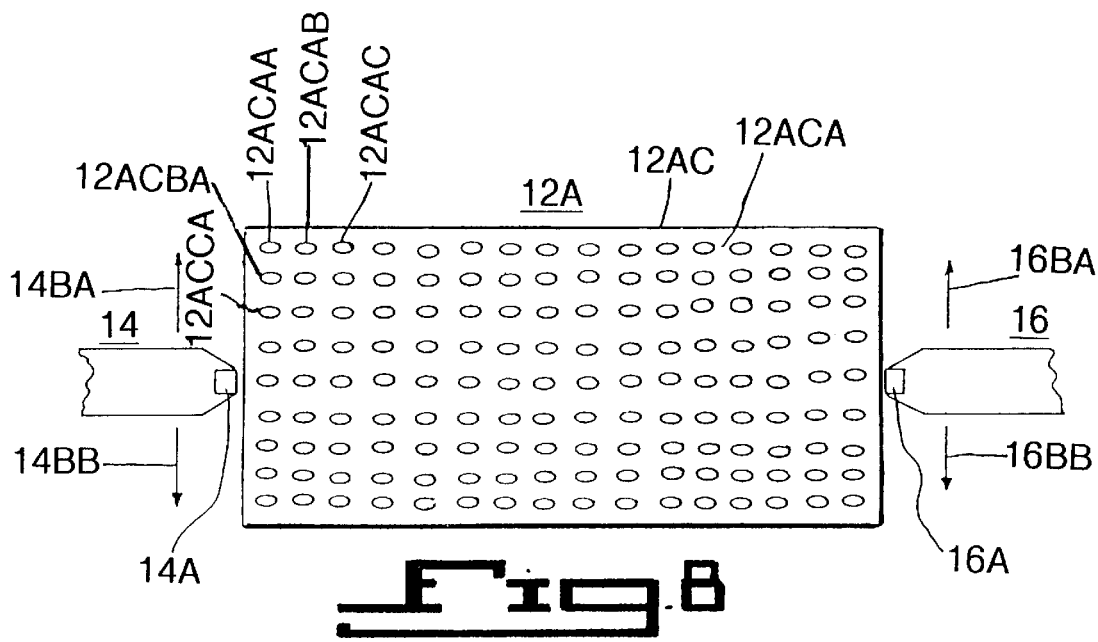
FIG. 8 is an enlarged view of a first disk side exhibiting a first disk side audio-visual track consisting of first disk side row/column divots which are being scanned by a visual scanner and an audio scanner.

Firstly, referring to FIG. 1 which is a left perspective view of a segmented cylindrical audio-visual device (10) exhibiting a multiple of disks (12) interlocked with one another. The cylindrical audio-visual device (10) is composed of a multiple of interlocking disks (12). The interlocking disks (12) consist of a first disk (12A) which is interlocked to a second disk (12B) which is interlocked to a third disk (12C) which is interlocked to a forth disk (12D) which is interlocked to a fifth disk (12E) which is interlocked to a sixth disk (12F) which is interlocked to a seventh disk (12G) which is interlocked to a eighth disk (12H) which is interlocked to a ninth disk (12I) which is interlocked to a tenth disk (12J). Each of the interlocking disks (12) represent a separate audio and a separate visual track on each separate disk (12). For example, first disk (12A) has a first disk side (12AC) having a first disk side audio-visual track (12ACA) thereon. Another example, second disk (12B) has a second disk side (12BC) having a second disk side audio-visual track (12BCA) thereon. Therefore, first through tenth disks (12A, 12B, 12C, 12D, 12E, 12F, 12G, 12H, 12I, 12J) have respective first through tenth disk sides (12AC, 12BC, 12CC, 12DC, 12EC, 12FC, 12GC, 12HC, 12IC, 12JC) having respective first through tenth disk side audio-visual tracks (12ACA, 12BCA, 12CCA, 12DCA, 12ECA, 12FCA, 12GCA, 12HCA, 12ICA, 12JCA) thereon. By interlocking different disks (12) together in different combinations, a user can create his own custom audio and visual ensemble.

At the left terminal end is a first disk (12A) having a first disk top side male connector shaft (12AABB) which securely interlocks into a left side of a disk playing device (not shown).

Now referring to FIG. 2 which is a right perspective view of a segmented cylindrical audio-visual device (10) exhibiting a multiple of disks (12) interlocked with one another. At the right terminal end is a tenth disk (12J) having a tenth disk top side male connector shaft (12JABB) which securely interlocks into a right side of a disk playing device (not shown). The terminal disk (12) shown herein is the tenth disk (12J) which comprises a tenth disk side (12JC) having a tenth disk side audio-visual track (12JCA) thereon, a tenth disk bottom side (12JB) consisting of a tenth disk bottom side female connector (12JBB) having a tenth disk bottom side female connector spacer (12JBBA) within which a tenth disk bottom side female connector receptacle (12JBBB) with a tenth disk bottom side female connector lock (12JBBC) is positioned.

Referring to FIG. 3 is a top view of a first disk (12A). The first disk (12A) consists of a first disk top side (12AA) and a first disk side (12AC). Securely fastened upon the first disk top side (12AA) is a first disk top side male connector (12AAB) which further consists of a first disk top side male connector spacer (12AABA) securely mounted thereon. The first disk top side male connector spacer (12AABA) having a first disk top side male connector shaft (12AABB) with a first disk top side male connector lock (12AABC) securely mounted thereon.

The first disk side (12AC) has a first disk side audio-visual track (12ACA) thereon.

Now referring to FIG. 4 which is a bottom view of a first disk (12A). The first disk (12A) has a first disk bottom side (12AB) which comprises a first disk bottom side female connector (12ABB) securely mounted thereon. The first disk bottom side female connector (12ABB) further consists of a first disk bottom side female connector spacer (12ABBA) having a first disk bottom side female connector receptacle (12ABBB) with a first disk bottom side female connector lock (12ABBC) therein.

Referring now to FIG. 5 which is a cross-sectional view of a a segmented cylindrical audio-visual device (10) exhibiting a multiple of disks (12) interlocked with one another. The first disk (12A) has a first disk bottom side female connector (12ABB) which interlocks into a second disk (12B) having a second disk top side male connector shaft (12BABB). Thereby, the first through tenth disks (12A, 12B, 12C, 12D, 12E, 12F, 12G, 12H, 12I, 12J) interlock with one another. By interlocking different disks (12) together in different combinations, a user can create his own custom audio and visual ensemble. The combination of disks (12) have respective first through tenth disk sides (12AC, 12BC, 12CC, 12DC, 12EC, 12FC, 12GC, 12HC, 12IC, 12JC) having respective first through tenth disk side audio-visual tracks (12ACA, 12BCA, 12CCA, 12DCA, 12ECA, 12FCA, 12GCA, 12HCA, 12ICA, 12JCA) thereon which are played in a disk playing device (not shown).

At the left terminal end is a first disk (12A) having a first disk top side male connector shaft (12AABB) which securely interlocks into a left side of a disk playing device (not shown).

Referring to FIG. 6 which is a cross-sectional view of a first disk (12A) and second disk (12B) being interlocked with one another. The first disk (12A) has a respective first disk bottom side female connector (12ABB) securely fastened on the first disk bottom side (12AB). The first disk bottom side female connector (12ABB) has a first disk bottom side female connector receptacle (12ABBB) with a first disk bottom side female connector lock (12ABBC) therein. The second disk top side male connector shaft (12BABB) is inserted into the first disk bottom side female connector receptacle (12ABBB) until the outermost distal end of the first disk bottom side female connector spacer (12ABBA) comes in contact with the second disk top side male connector spacer (12BABA). Therefore, the first disk side (12AC) having a first disk side audio-visual track (12ACA) thereon is adjacent to the second disk side (12BC) having a second disk side audio-visual track (12BCA) thereon. The disk playing device (not shown) first plays the first disk side audio-visual track (12ACA) and then the adjacent second disk side audio-visual track (12BCA). The first disk (12A) has a first disk core (12AD) which preferably is hollow to reduce weight but can be solid as shown herein. Concurrently, the second disk (12B) has a second disk core (12BD) which preferably is hollow to reduce weight but can be solid as shown herein.

The disks (12) are manufactured from a group of materials selected from a group consisting of plastic, plastic composite, rubber, rubber composite, metal, metal alloy, and glass.

Referring to FIG. 7 which is a bottom perspective view of a second disk (12B) having a second disk top side male connector shaft (12BABB) being inserted into a first disk bottom side female connector receptacle (12ABBB). The first disk bottom side female connector lock (12ABBC) within the first disk bottom side female connector receptacle (12ABBB) is preferably a half moon shaped receptacle and the second disk top side male connector lock (12BABC) on the second disk top side male connector shaft (12BABB) is preferably a complimentary half moon shaped key thereby easily snapping into and out of the half moon shaped receptacle.

Referring to FIG. 8 which is an enlarged view of a first disk side (12AC) exhibiting a first disk side audiovisual track (12ACA) consisting of first disk side row/column divots (12ACAA–12ACZZ) which are being scanned by a visual scanner (14) and an audio scanner (16). The first disk side row/column divots (12ACAA–12ACZZ) represent binary (0's and 1's) coding which are optically scanned and converted digitally to electronic signals. The visual scanner (14) scans and converts digitally the first disk side row/column divots (12ACAA–12ACZZ) into electronic signals which are in turn converted to a visual output signal to be displayed on a monitor. The audio scanner (16) scans and converts digitally the first disk side row/column divots (12ACAA–12ACZZ) into electronic signals which are in turn converted to a audio output signal to be emitted from at least one speaker. Since both of the audio and visual electronic signals are on the same first disk side audio-visual track (12ACA), synchronization occurs simultaneously with scanning.

The visual scanner (14) has a visual scanner head (14A) in close proximity to the first disk side audio-visual track (12ACA). The visual scanner (14) moves in a visual scanner upward direction (14BA) and a visual scanner downward direction (14BB).

The audio scanner (16) has an audio scanner head (16A) in close proximity to the first disk side audio-visual track (12ACA). The audio scanner (16) moves in an audio scanner upward direction (16BA) and an audio scanner downward direction (16BB).

Figure 8A:
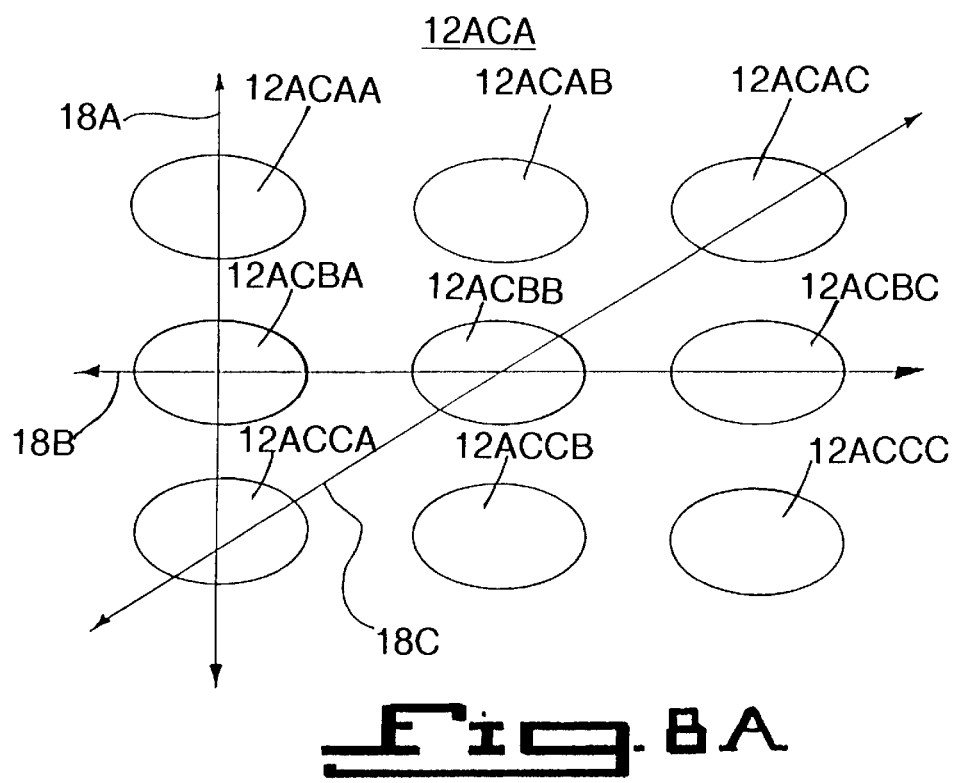
FIG. 8A is an enlarged view of a first disk side audio-visual track consisting of first disk side row/column divots.

Lastly, referring to FIG. 8A which is an enlarged view of a first disk side audio-visual track (12ACA) consisting of first disk side row/column divots (12ACAA–12ACCC). When the visual scanner (14) moves in a visual scanner upward direction (14BA) and a visual scanner downward direction (14BB) the first disk side row/column divots (12ACAA–12ACZZ) can be scanned in a up/down scanning direction (18A) and/or a left/right scanning direction (18B) and/or a diagonal scanning direction (18C) depending upon the specific design of the disk playing device (not shown). Concurrently, when the audio scanner (16) moves in an audio scanner upward direction (16BA) and an audio scanner downward direction (16BB), the first disk side row/column divots (12ACAA–12ACZZ) can be scanned in a up/down scanning direction (18A) and/or a left/right scanning direction (18B) and/or a diagonal scanning direction (18C) depending upon the specific design of the disk playing device (not shown). The first disk side row/column divots (12ACAA–12ACZZ) are arranged in a matrix commencing with first disk side row a/column a divot (12ACAA) and thereafter first disk side row a/column B divot (12ACAB), first disk side row a/column C divot (12ACAC), first disk side row B/column a divot (12ACBA), first disk side row B/column B divot (12ACBB), first disk side row C/column a divot (12ACCA), first disk side row C/column B divot (12ACCB), and terminating at first disk side row Z/column Z divot (12ACZZ).

It will be understood that each of the elements described above, or two or more together, may also find a useful application in other types of constructions differing from the type described above.

While the invention has been illustrated and described as embodied in a segmented cylindrical audiovisual device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. The method of selectively programming an audiovisual device comprising:

a) putting together an assembly of interlocking cylindrical disks stacked along a central axis, each disk having a top side with a male connector securely centrally mounted thereon, the male connector consisting of a male connector spacer having securely centrally mounted thereon a male connector cylindrical shaft, said shaft having a male connector lock consisting of a pair of radially spaced axially extending protuberances, and a bottom side of each disk having a female connector securely centrally mounted thereon consisting of a female connector spacer having securely centrally mounted thereon a female connector cylindrical receptacle with a female connector lock consisting of radially spaced slots to accommodate the axially aligned protuberances of said male connector lock, adjacent disks being connected to each other with the male connector of one disk being joined to the female connector of the adjacent disk;

b) forming on the outer surface of each said disk an audio-visual track consisting of a plurality of rows and columns of divots containing binary coding and arranged in a matrix configuration;

c) placing visual and audio optical scanners in close proximity to but not in contact with the outer surfaces of said disks for scanning said rows and columns of divots for converting the binary coding to electronic signals for conversion to visual and audio output; and d) disconnecting and reconnecting said disks to rearrange the order of said disks to permit the reprogramming of the material recorded on said stack of disks.

\* \* \* \* \*